UNITED STATES PATENT OFFICE.

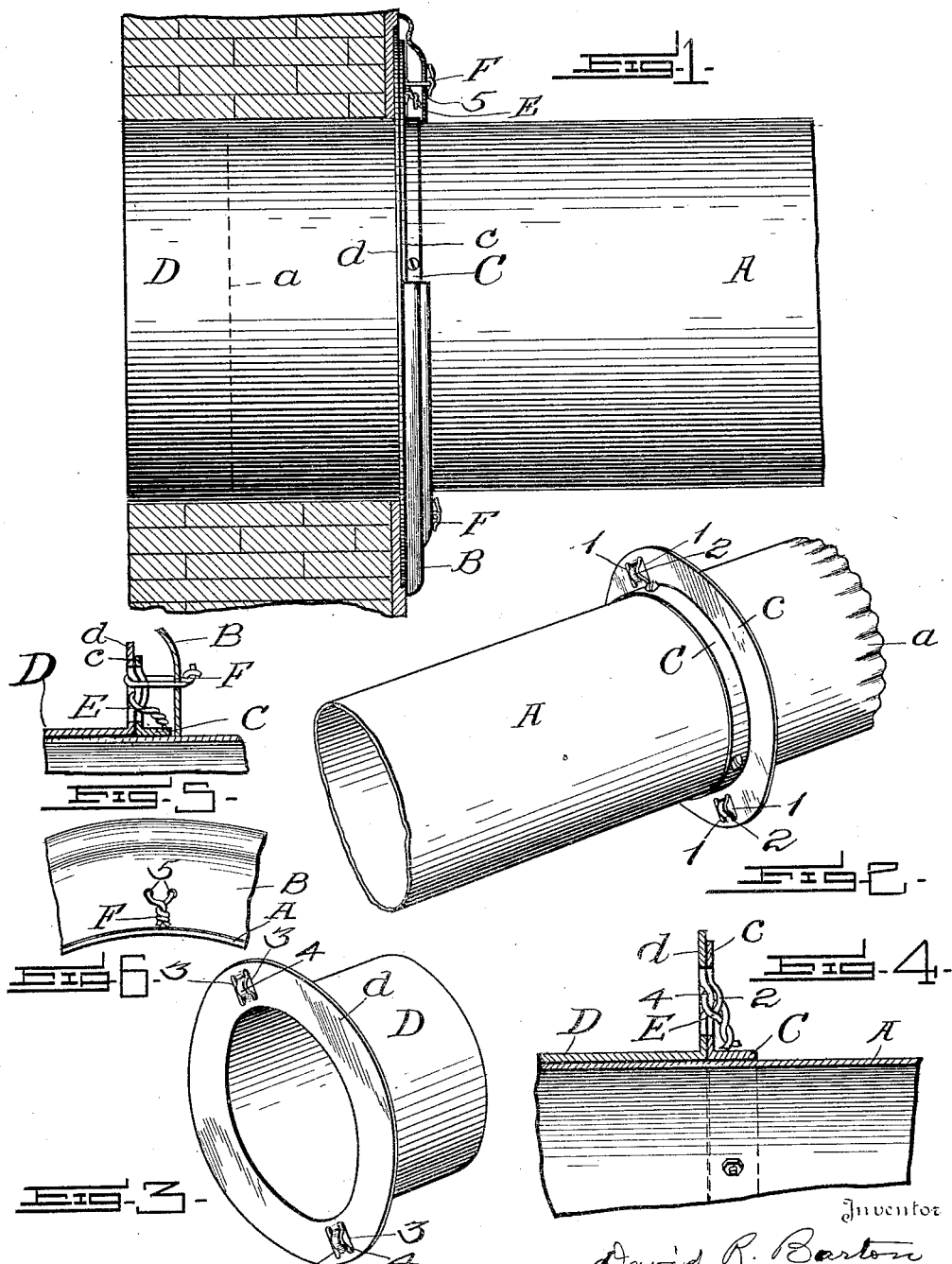

DAVID R. BARTON, OF NORTH YAKIMA, WASHINGTON.

STOVEPIPE-LOCK.

1,109,030. Specification of Letters Patent. Patented Sept. 1, 1914.

Application filed June 3, 1914. Serial No. 842,664.

*To all whom it may concern:*

Be it known that I, DAVID R. BARTON, a citizen of the United States, residing at North Yakima, in the county of Yakima and State of Washington, have invented certain new and useful Improvements in Stovepipe-Locks, of which the following is a specification.

This invention relates to means for fastening stove-pipes or other tubular parts to flues in setting up stoves and more especially to specially constructed stove-pipe thimbles and attachments of the pipe sections entering the same with devices for detachably fastening the same.

The chief object of the invention is to provide easy and expeditious means of arranging the stove pipe securely with exactly the desired penetration of the lateral opening into the chimney flue, without the necessity of defacing the plaster by driving in nails, the risk of injury incident to hammering on devices penetrating sheet metal parts and the need for employing any inconvenient substitutes; the pipe being very easily detached from the thimble without detriment to any part, but held with absolute security until thus intentionally separated.

To these ends my invention consists in the construction and combination of parts hereinafter particularly set forth and claimed.

In the accompanying drawings: Figure 1 represents a side elevation, partly broken away, of the devices embodying the invention and the means for fastening them in place; Fig. 2, a detail perspective view of a part of the stove-pipe section having the slotted flange attached; Fig. 3, a detail view of the thimble; Fig. 4 represents an enlarged sectional detail view of a part of the pipe flange and corresponding part of the thimble fastened together before the collar is applied. Fig. 5 represents a detail sectional view similar to Fig. 4 (on a smaller scale) but showing a part of the collar and both of the fastening wires; and Fig. 6 represents a detail front elevation of a part of the collar showing one of the pairs of holes and the ends of the fastening wire passing therethrough and twisted on the outside.

A designates a part of an ordinary length of section of stove-pipe crimped at the end $a$ as usual, but having no bead to prevent sliding the collar B along the same.

C represents a ring of sheet iron fastened on pipe-length of section A at a predetermined point according to the extent of penetration needed into the thimble D, which as usual fits the lateral opening leading to the flue and has on its inner end an annular flange $d$, set flush into the plaster around said hole. Ring C has a flange $c$ corresponding to flange $d$ in size and construction and brought face to face therewith by the insertion of the pipe, so that the flange $d$ acts as a stop for said pipe.

The flange $c$ of pipe ring C is provided at equal circumferential intervals with pairs of radial slots 1, the slots of each pair leaving between them a thin strap 2 of metal integral with the said flange and serving for purposes of attachment. Similarly and at corresponding intervals the thimble flange $d$ is provided with like pairs of slots 3, the slots of each of these pairs having between them a strip 4, like the strips 2 aforesaid. The material at the edges of slots 1 and 3 and on each side of strips 2 and 4 is preferably pressed in from the front to facilitate the passing of a fastening wire between each strip and the body of the flange $c$ or $d$. The ring C is preferably fastened detachably by stove bolts as shown, but riveting or any other suitable means of rigid attachment obviously may be employed. The collar B is provided with pairs of holes 5, corresponding in circumferential position to slots 1 and 3.

Two fastening wires E and F are provided for each point of attachment, the former for holding the two flanges together, the latter wire, which is longer, for holding the collar to them and reinforcing the first wire.

The method of assembling the parts and fastening the stove pipe in place is as follows. The thimble being fixed in its aperture as usual, the wires E are passed under the strips 4 of thimble-flange $d$, each wire passing in at one slot 3 of the pair and out at the other. The end of the stove pipe is then inserted until the flanges $c$ and $d$ are in contact. The wires E are then carried around the strips 2 and twisted in front of the same, binding said flanges together. The wires F may be inserted before this operation is complete or afterward, the former being easier. In either case each of them is passed behind both strips 2 and 4, entering through the registering slots of the flanges on one side of the strip and passing out through the other, with their loose ends projecting. The collar B is then moved up near the flanges c and d, the ends of the wires F are passed out through the holes 5, the collar is slipped along them and along the pipe against flange c, covering it and flange d, and the wires F are then twisted to bind the collar, the flanges and all the parts together.

When the stove is too near the flue for the interposition of a separate stove-pipe section, the ring C may be on the stove pipe elbow or other tubular outlet for the products of combustion, this tubular part entering the flue. It is of course a form of stove pipe and sufficiently represented by the end part A of the inserted end of the pipe in the figures. In this case, after putting the collar on the elbow and bolting the circular ring to the elbow I pass two pieces of wire such as E or F, but about one foot long through the slots of the thimble flange, and then through the holes in the collar, push the elbow into the flue and at the same time draw the wires tight and twist them.

The various parts and devices above described, except the wires and bolts, are preferably made of sheet iron, though I do not restrict myself to any particular material.

Having thus described my invention, what I claim as new and desire to secure by Letters Patent is:

1. A thimble for a stove-pipe hole provided with a flange having pairs of slots and intermediate strips arranged at intervals, in combination with fastening means adapted to pass behind said strips, a tubular part adapted to enter said thimble and an attachment of said tubular part acting as a stop therefor and adapted to be engaged at corresponding intervals by said fastening means for holding the parts together.

2. A thimble and ring each provided with a flange, in combination with a stove pipe on which said ring is fixed and flexible means for fastening said flanges together, said flanges being provided with corresponding parts adapted to have said flexible means passed behind and around them for fastening said flanges against each other.

3. A pipe provided with a fixed ring having a flange provided with pairs of slots and intervening strips, in combination with a flexible fastening device adapted to be passed through said slots and around said strips, and a thimble having a flange which is adapted to be engaged by said fastening devices.

4. A tubular outlet device for products of combustion provided with a stop flange which is slotted to provide strips at intervals, in combination with fastening means, a thimble adapted to receive the end of said outlet device and provided with a flange for contact with that first above mentioned and having parts which may be engaged by said fastening means, the latter being also adapted to engage said strips.

5. In combination with a pipe or tube, a ring fastened thereon and having a flange which is provided at intervals with pairs of slots to provide strips, a thimble adapted to receive the end of said pipe or tube and provided with a flange having slots and strips corresponding to those first above mentioned, wires adapted to pass through said slots behind the strips of the thimble flange and in front of the strips of the ring flange and bind said flanges together by being twisted.

6. In combination with a thimble having a series of pairs of slots, a movable stove-pipe collar having a corresponding series of pairs of holes, a stove-pipe stop flange on said pipe and wires for drawing said collar, thimble and stop-flange together and fastening them in this position.

7. In combination with a thimble having a flange provided with a series of pairs of slots, a stove-pipe adapted to enter said thimble, a ring fast on said pipe, having a flange adapted to fit against said thimble-flange and correspondingly provided with pairs of slots and wires for fastening said flanges together by passing through said slots and around the intervening material and being suitably closed for binding action.

8. In combination with a thimble provided with a flange having a series of pairs of slots, a stove-pipe adapted to enter said thimble, a ring attached to said pipe and having a flange similarly provided with pairs of slots, a collar loose on said pipe but correspondingly provided with pairs of holes, a series of wires for passing through said slots and fastening said flanges together and a second series of wires for passing through said slots and holes and fastening said collar to said flanges beside reinforcing the former wires.

9. In combination with a thimble having a flange provided with a series of strips presented farther forward than the rest of the material and permitting wire to pass behind them, a stove-pipe adapted to enter said thimble, a ring fastened on said stove-pipe and provided with a flange having strips which correspond to strips first above mentioned, a collar provided with pairs of holes arranged in position approximately corresponding to said strips and wires passed behind said strips and through said holes to fasten said collar and flanges together.

10. A thimble and ring having corresponding flanges provided at intervals with parts adapted to have a wire passed around them, wires passed around said parts, a pipe having said ring fastened thereon and entering said thimble, a collar loose on said pipe and adapted to be engaged by wires and drawn to said flanges, and wires passing around said parts and engaging said collar to draw it into position against said flanges and hold it there.

11. A thimble having a flange provided with a pair of slots and an intervening strip, in combination with a stove pipe entering said thimble, a ring fastened on said pipe and having a flange provided with a corresponding pair of slots and intervening strip and a wire for engaging said strips and binding said flanges together.

In testimony whereof, I have signed my name to this specification in the presence of two subscribing witnesses.

DAVID R. BARTON.

Witnesses:
KATE LAUR,
HENRY H. WENDE.

Copies of this patent may be obtained for five cents each, by addressing the "Commissioner of Patents, Washington, D. C."